Dec. 25, 1951   O. G. LELLEP   2,580,235
MANUFACTURING WET PROCESS CEMENT
Filed Feb. 28, 1947
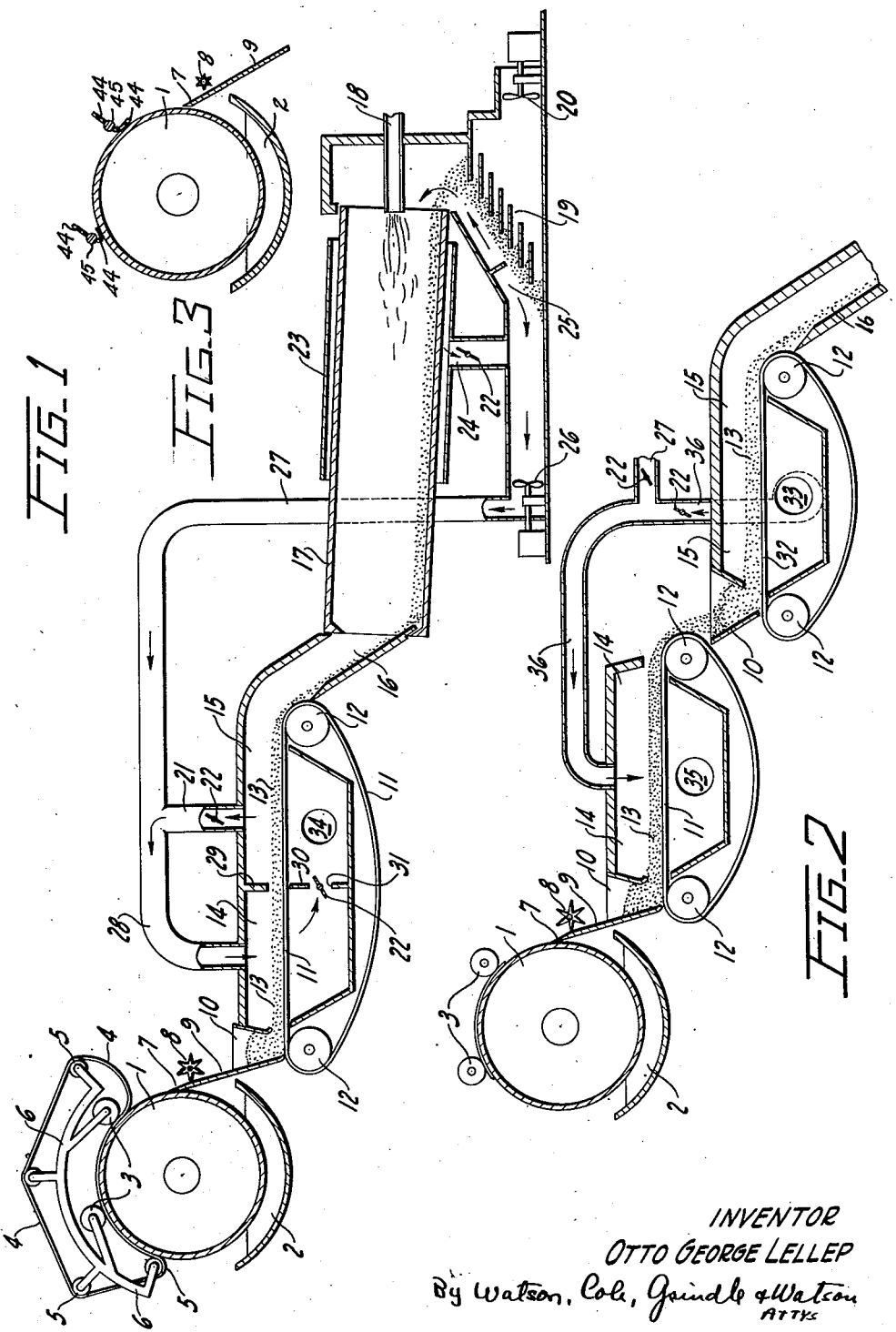
INVENTOR
OTTO GEORGE LELLEP
By Watson, Cole, Grindle & Watson
ATTYS Patented Dec. 25, 1951

2,580,235

UNITED STATES PATENT OFFICE 2,580,235

MANUFACTURING WET PROCESS CEMENT

Otto George Lellep, Berkeley, Calif.

Application February 28, 1947, Serial No. 731,505

4 Claims. (Cl. 263—53)

This invention relates to the method of, and apparatus for, manufacturing wet process cement. The principal object of the invention is to lower the amount of fuel for burning in a radical way.

As compared with the dry cement manufacturing method, the wet process has the advantages that a more satisfactory mixture of the raw materials can be made and a more constant composition can be maintained, moreover that grinding of wet material requires less power and the output of the mills is greater, and also the clinker of the wet process is more easily ground; besides, there is less dust connected with the wet process than with the dry process. There is, however, the disadvantage that much more fuel is required to burn a slurry than is needed for burning a dry mixture. This invention remedies that disadvantage without in the least detracting from the admitted advantages of the wet process. At present the heat consumption of the wet process fluctuates around 1,300,000 B. t. u. per barrel (bbl.). Through my inventions forming the subject matter of prior patents numbered 1,775,313, 1,992,704 and 1,994,718, all of which are related to the dry process, I succeeded in considerably increasing the fuel economy of that process, reducing the heat consumption to about 700,000 B. t. u. per bbl. My present invention enables the wet process to be carried out with heat requirements that are but slightly higher than those attained with the dry process by the fuel saving arrangements according to my previous inventions. The present invention will reduce the heat consumption for the wet process for instance to 770,000 B. t. u. per bbl.

It constitutes the essence of my inventions described and claimed in the said prior patents that the finely divided mix of the pulverulent raw materials is sprayed with water while the mix is constantly turned over in a rotating drum during the sprinkling operation, and thus caused to form small agglomerates of pea or bean size, which are then dried and preburned on a gas permeable grate or the like by causing hot waste gases to pass through a progressing layer of the agglomerated material, and are subsequently introduced into a kiln, e. g. a rotary furnace, for final burning; preferably the waste gases of the kiln are used for drying and preburning the agglomerates upon a traveling carrier. For the purpose of rendering that fuel saving principle applicable to the manufacture of wet process cement, the fluid raw mix, called slurry, as it leaves the grinders of the wet process, has first to be converted into a breakable cake. It is customary to partially dewater said fluid slurry by passing it over continuous drum type vacuum filters which deliver a cake with a water content of from about 19 to 22 per cent or even more. Such a cake has a pasty consistency like thin putty and can not be broken into non-collapsible fragments which are capable of forming a gas pervious layer of a thickness surpassing many times the thickness of the single fragment.

For an efficient heat transmission from hot kiln exit gas to the layer of raw mixture aggregate on the grate it is essential that this layer be of uniform thickness and uniform gas permeability, so that all the waste gas could pass through that layer with a suitable pressure drop.

It has been suggested to take off the usual pasty, sticky filtercake from the filter and predry it in separate drying equipment as a sheet of cake or a thin layer of cake, for instance of the same thickness as the cake. This suggestion to be realized requires additional predrying equipment and heat which are costly.

On a conventional filter the product of partially dewatered cement slurry is a pasty filtercake. A further removal of water is limited due to the fact that the cake of most cement materials cracks when it is dewatered from 19 to 22 percent water content. A cracking of the cake causes loss of vacuum and dewatering stops.

The conventional filtercake of cement raw mix is too wet, pasty and collapsible to form a thick gas permeable layer on the grate for my previous invention. Predrying of the pasty cake in an additional predrying equipment and employing of a layer of fragments of predried cake by my previous invention was too complicated and costly.

These abovementioned reasons hindered heretofore an application of my previous invention 1,992,704 to the wet process.

My present invention overcomes these difficulties by employing special improved filtering methods which produce not the usual pasty cake, but a breakable cake which in fragmented state can be charged directly in thick layer on the grate of my invention 1,992,704. This can be effected by compressing or compacting the filtercake stratum, or by subjecting it to agitation, or vibration, or to the action of a beating device during, or between dewatering operations. These methods prevent a premature cracking of most cakes, produce a denser, rigid cake which has a water content of between about 14 and 20% instead of the conventional water content from 19 to 22% or higher. Such specially dewatered cake is rigid enough to be broken into a non-collapsible, almost nonsticky fragments in sizes mostly between ⅛ inch and one inch.

The fragments or aggregates of specially dewatered filter cake are fed or charged in a 4 to 12 inch thick layer upon the gas pervious conveyor or grate of my previous invention 1,992,704 and they replace the nodules, granules or agglomerates of the dry process. It is apparent, therefore, that the present invention results in further conservation of power by eliminating the nodulizer generally employed in such processes, and in any event, permits reducing the size and the power consumption of the nodulizer when it is retained as a unit of the cement manufacturing process as it may be desirable to do in some instances.

The present invention causes a fuel saving of about 40% in wet process. Most of the raw cement slurries are adapted for being treated according to the method described. There are, however, slurries which can not be filtered economically due to presence of colloidal clay.

Two forms of construction based on the principles of the invention are shown, by way of example, in the accompanying drawings, in which:

Fig. 1 is a diagrammatical sectional view of one embodiment of the invention.

Fig. 2 shows a sectional view of a modified form of construction.

Figure 3 illustrates another form of compacting apparatus which may be utilized in conjunction with the vacuum filter drum.

1 indicates a drum like vacuum filter which is supported for rotation, 2 is a tank or vessel below the filter drum which receives fluid slurry of raw cement mixture. The drum may be rotated in any convenient manner. This filter is equipped with means for compacting the filter cake bed formed, for instance with compression rolls 3. In the construction shown in Fig. 1, these compression rolls 3 exercise a pressure on the filter cake bed through an absorbent compression belt 4, which is moved by the filter surface and carried by guiding rolls 5. The rolls 3 and 5 are fixed to a supporting member 6, this compression mechanism prevents premature cracking of the filter cake bed formed on the surface of the drum and a consequent loss of vacuum.

Other means and methods known of themselves may be applied to arrive at compacting the filter cake bed during or between the vacuum dewatering operations, and thus to obtain a filter cake with unusually low water content. The cake may for instance be agitated with pulsating air introduced into the vacuum system, or by the action of a vibrating roller on the surface of the cake. A somewhat similar effect is attainable by slapping the cake with pieces of belting 44 fixed to a rotation shaft 45 that is arranged above the travelling filter cake bed.

In whatever manner the compacting of the filter cake bed may be brought about, the filter cake should be sufficiently rigid when it arrives at the discharging point, where, as shown in the drawings, a scraper 7 is provided for removing the filter cake stratum from the surface of the drum and supplying the material to a crusher or breaker 8, the fragments produced gliding over a chute 9 into a bin 10.

According to the construction shown in Fig. 1, the filter cake fragments are then distributed in layer 13 on a gas permeable travelling carrier 11, e. g. a conveyor belt, which is carried and moved by rollers 12, said carrier being arranged to pass consecutively through a drying system 14 and a preburning system 15 which are separated through wall 29 above the conveyor belt and by wall 30 below the conveyor belt, in which latter wall there is an opening 31 with a regulating damper 22. The pretreated charge is then caused to pass over a chute 16 into a rotary kiln 17, where it is calcined and eventually conveyed into a clinkering zone kept at white heat which is supplied by burner 18. From the lower end of the rotary kiln clinker falls into the clinker cooler 19, where it is cooled by air which is supplied by motorized propeller fan 20.

The main part of heat on the grate 11 is derived from the exit gas of the rotary kiln 17 that fills the chamber 15. In the preburning system, this gas which is in a temperature range around 1000° C., is caused to pass in a downward motion through the gas pervious filter cake layer 13 piled up on the traveling carrier. Another part of high temperature gas entering chamber 15 is bypassed into the drying system 14 through channel 21 where the flow is controlled by damper 22. The air heated by radiation from the hottest part of the kiln shell is collected by hood 23 opening into channel 24 that is equally equipped with a damper 22. Surplus warm air is directed from clinker cooler 19 through duct 25, to join with the hot air coming through channel 24, and the mixture is moved by fan 26 through duct 27 to join with the hot gas issuing from channel 21 and flowing into the drying system 14 through channel 28. In the drying chamber the gas which is moved by the fan draft passes through layer 13 and grate 11. The exit gases of both the drying and preburning systems are conducted to atmosphere through fan opening 34, the flow of the hot gases being effected by the fan draft and the whole gas circulation being adjusted by the respective dampers 22, in such a manner that the temperature above the drying grate is kept at approximately 300° C.

The construction shown in Fig. 2 essentially differs from that illustrated in Fig. 1 only in the detail that the drying and preburning systems are separated from each other, the preburning system being directly heated by the exit gases of the rotary kiln while the drying system receives the exit gases issuing from the preburning system. The traveling carrier 11 moving through the drying system discharges the dried filter cake fragments into a large bin 10, from where they are fed upon another gas permeable carrier 32 arranged to move through a separate preburning system. The exit gas from this system is moved through layer 13 by fan 33 into channel 36 from where it flows into the drying chamber 14.

A branch line 27 with damper 22 is provided for a supply of additional hot air heat derived from the lower end of the rotary kiln as shown on Fig. 1. In case in doing so a too high temperature for drying would be produced, atmospheric air is simultaneously introduced into channel 36 to keep the drying gas temperature around 300° C. The arrangement on Fig. 2 allows a better heat utilization than on Fig. 1. Bin 10 between the two grates in Fig. 2 has a large capacity for dried cake which serves as reserve feed for the preheating grate and the kiln in case the filter is stopped temporarily for repairs or servicing.

The main feature of this invention is the combination of steps in which the wet process raw mixture slurry is dewatered by mechanical means in contrast to thermal from the state of paste into a more rigid and breakable state with a water content of between 14 and 21 per cent and feeding a 4 to 12 inch thick gas pervious, noncollapsible layer of aggregates prepared from this rigid, dewatered slurry without preliminary drying upon the grate of my previous invention 1,992,704 for a final drying and preburning. Instead of using a layer of fragmented filter cake produced by a drum filter a rigid, breakable filter cake can be produced also by a filter of multiple disc type of larger capacity if the cake on this filter is compacted during the filtration process. A low water, rigid, and breakable cake produced by a disc filter can be formed into suitable, small aggregates of any shape like slugs, pills, briquettes, sausages, by using a pug mill or a press. A layer of such aggregates can be charged directly upon the grate of my invention 1,992,704.

I claim:

1. An apparatus for manufacturing wet process cement comprising a rotary kiln having a pretreatment apparatus into which the hot exhaust gases from the kiln are delivered, in combination with a filter drum having a pervious wall, means for establishing a reduced pressure at the interior surface of the said pervious wall, means for delivering cement slurry to the exterior surface of said pervious wall, a compacting means disposed immediately above the exterior surface of said pervious wall and positioned to compress material carried on the said exterior surface, and delivery means operably associated with said exterior surface and compacting means for receiving material from said exterior surface and delivering the material to the said pretreatment apparatus.

2. An apparatus as claimed in claim 1 in which said compacting means comprises cylindrical rolls freely supported on shafts mounted in parallelism with the axis of said drum.

3. An apparatus as claimed in claim 2 in which said compacting means comprises an endless belt passing around said cylindrical rolls between the said rolls and the exterior surface of said pervious wall.

4. An apparatus for manufacturing wet process cement comprising a rotary kiln having a pretreatment apparatus into which the hot exhaust gases from the kiln are delivered, in combination with a filter drum having a pervious wall, means for establishing a reduced pressure at the interior surface of said pervious wall, means for delivering cement slurry to the exterior surface of said pervious wall, a compacting means comprising a rotary shaft having a flexible plate fixed thereto and extending radially therefrom disposed immediately above the exterior surface of said pervious wall and positioned to compress material carried on the said exterior surface, and delivery means operably associated with said exterior surface and compacting means for receiving material from said exterior surface and delivering the material to the said pre-treatment apparatus.

OTTO GEORGE LELLEP.

REFERENCES CITED

The following references are of record in the file of this patent:

UNITED STATES PATENTS

| Number | Name | Date |
|---|---|---|
| Re. 19,137 | Wright et al. | Apr. 17, 1934 |
| 1,775,313 | Lellep | Sept. 10, 1930 |
| 2,049,071 | McCormick | July 28, 1936 |
| 2,096,176 | Harrington | Oct. 19, 1937 |
| 2,125,263 | Ahlmann | Aug. 2, 1938 |
| 2,174,066 | Ahlmann | Sept. 26, 1939 |
| 2,290,068 | Petersen | July 14, 1942 |
| 2,326,512 | Andrews | Aug. 10, 1943 |